United States Patent
Kim et al.

(10) Patent No.: US 12,341,175 B2
(45) Date of Patent: Jun. 24, 2025

(54) BATTERY MODULE AND BATTERY PACK INCLUDING THE SAME

(71) Applicant: LG Energy Solution, Ltd., Seoul (KR)

(72) Inventors: Min Seop Kim, Daejeon (KR); Junyeob Seong, Daejeon (KR); Sunghwan Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 581 days.

(21) Appl. No.: 17/621,113

(22) PCT Filed: Mar. 11, 2021

(86) PCT No.: PCT/KR2021/003033
§ 371 (c)(1),
(2) Date: Dec. 20, 2021

(87) PCT Pub. No.: WO2021/215662
PCT Pub. Date: Oct. 28, 2021

(65) Prior Publication Data
US 2022/0352575 A1 Nov. 3, 2022

(30) Foreign Application Priority Data
Apr. 22, 2020 (KR) .................. 10-2020-0048652

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/617* (2015.04); *H01M 10/647* (2015.04);
(Continued)

(58) Field of Classification Search
None
See application file for complete search history.

(56) References Cited

U.S. PATENT DOCUMENTS 8,835,038 B2 * 9/2014 Abels .................. H01M 10/647
429/120
2012/0156543 A1 6/2012 Cicero et al.
(Continued)

FOREIGN PATENT DOCUMENTS

| CN | 104471784 A | 3/2015 |
| CN | 207441924 U | 6/2018 |

(Continued)

OTHER PUBLICATIONS

Machine Translation of JP 2014216298A. (Year: 2014).*
(Continued)

*Primary Examiner* — Gregg Cantelmo
(74) *Attorney, Agent, or Firm* — Lerner David LLP (57) ABSTRACT

A battery module includes: a battery cell stack in which a plurality of battery cells are stacked; a module frame for accommodating the battery cell stack; and a heat sink formed on the lower side of the module frame to cool the plurality of battery cells. The heat sink includes a lower plate and a flow path part which defines a flow path for a refrigerant. The flow path part includes: a first path set that collects first flow paths formed in a direction perpendicular to the stacking direction of the battery cell stack; and a second path set that collects second paths formed in a direction parallel to the stacking direction of the battery cell stack, whereby a total length of the second path set is longer than a total length of the first path set.

12 Claims, 11 Drawing Sheets

(51) Int. Cl.
*H01M 10/617* (2014.01)
*H01M 10/647* (2014.01)
*H01M 10/6554* (2014.01)
*H01M 50/204* (2021.01)
*H01M 50/211* (2021.01)
*H01M 50/24* (2021.01)

(52) U.S. Cl.
CPC ..... *H01M 10/6554* (2015.04); *H01M 50/204* (2021.01); *H01M 50/211* (2021.01); *H01M 50/24* (2021.01); *H01M 10/613* (2015.04); *H01M 2220/20* (2013.01)

(56) References Cited

U.S. PATENT DOCUMENTS

| | | |
|---|---|---|
| 2012/0313559 A1 | 12/2012 | Tonomura et al. |
| 2014/0023906 A1 | 1/2014 | Hashimoto et al. |
| 2015/0140388 A1 | 5/2015 | Harada et al. |
| 2016/0036104 A1* | 2/2016 | Kenney ............ F28F 3/12 165/170 |
| 2019/0131674 A1 | 5/2019 | Lu et al. |
| 2020/0058974 A1* | 2/2020 | Lim ............ H01M 10/6554 |
| 2020/0067155 A1 | 2/2020 | Hwang et al. |
| 2020/0152931 A1* | 5/2020 | Kim ............ H01M 10/6554 |
| 2022/0344744 A1 | 10/2022 | Kim et al. |

FOREIGN PATENT DOCUMENTS

| | | |
|---|---|---|
| CN | 209266461 U | 8/2019 |
| CN | 110838605 A | 2/2020 |
| CN | 110931911 A | 3/2020 |
| CN | 114424385 A | 4/2022 |
| EP | 4016702 A1 | 6/2022 |
| EP | 4016703 A1 | 6/2022 |
| EP | 4047720 A1 | 8/2022 |
| EP | 4087018 A1 | 11/2022 |
| JP | 2012256521 A | 12/2012 |
| JP | 2014216298 A | 11/2014 |
| JP | 2016081844 A | 5/2016 |
| KR | 20160024187 A | 3/2016 |
| KR | 20160065637 A | 6/2016 |
| KR | 20180091443 A | 8/2018 |
| KR | 20200020476 A | 2/2020 |
| KR | 20200021608 A | 3/2020 |
| WO | 2012133708 A1 | 10/2012 |
| WO | 2013171885 A1 | 11/2013 |
| WO | 2021206383 A1 | 10/2021 |
| WO | 2021206514 A1 | 10/2021 |

OTHER PUBLICATIONS

Extended European Search Report including Written Opinion for Application No. 21793726.7 dated Sep. 5, 2022, pp. 1-7.
Search Report dated Feb. 13, 2023 from the Office Action for Chinese Application No. 202180003938.7 issued Feb. 15, 2023, 3 pages.
International Search Report for PCTKR2021003033 dated Jul. 5, 2021, 2 pgs.

* cited by examiner

[FIG. 1]

PRIOR ART

[FIG. 2]

PRIOR ART

[FIG. 3]

Temperature deviation occurred

PRIOR ART

BATTERY MODULE AND BATTERY PACK INCLUDING THE SAME

CROSS-REFERENCE TO RELATED APPLICATIONS

This application is a national phase entry under 35 U.S.C. § 371 of PCT/KR2021/003033, filed on Mar. 11, 2021, which claims the benefit of Korean Patent Application No. 10-2020-0048652 filed on Apr. 22, 2020 with the Korean Intellectual Property Office, the disclosure of which are incorporated herein by reference in their entireties.

CROSS-REFERENCE TO RELATED APPLICATIONS

The present disclosure relates to a battery module and a battery pack including the same, and more particularly, to a battery module having improved cooling performance, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery module may include a battery cell stack in which a plurality of battery cells are stacked, a module frame for accommodating the battery cell stack, and a heat sink for cooling the plurality of battery cells.

Figure 1:
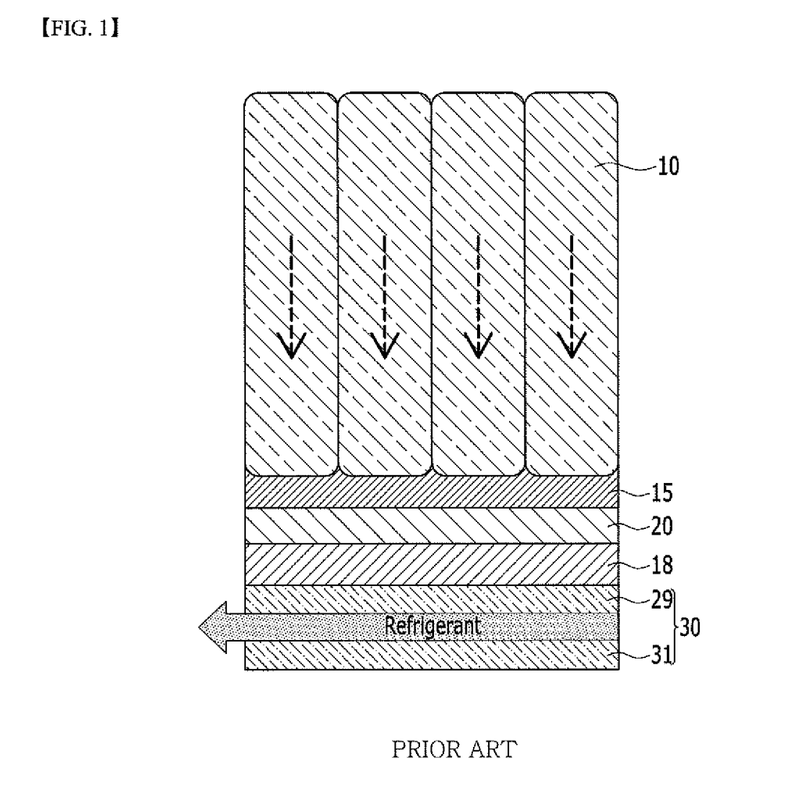
FIG. 1 is a diagram showing a battery module coupled to a heat sink according to the prior art.

FIG. 1 is a diagram showing a battery module coupled to a heat sink according to the prior art.

Referring to FIG. 1, a conventional battery module includes a battery cell stack in which a plurality of battery cells 10 are stacked, a module frame for accommodating the battery cell stack, and a thermal conductive resin layer 15 located between a bottom part 20 of the module frame and the battery cell stack. Such a battery module can be formed under the bottom part 20 of the module frame and coupled with a heat sink 30 that provides a cooling function to the plurality of battery cells 10, thereby forming a battery pack. Here, a thermal conductive layer 18 can be further formed between the bottom part 20 of the battery module and the heat sink 30. In this case, the heat sink includes a lower plate 31 and an upper plate 29, and a refrigerant may flow between the lower plate 31 and the upper plate 29.

Conventionally, in order to improve the cooling performance of the battery module and/or the battery pack, a separate cooling structure, for example, a heat sink, is required for each battery pack unit. Therefore, the cooling structure tended to be complicated, and the space between the refrigerant and the battery cell stack 10 is formed by a multi-layer structure consisting of an upper plate 29, a module frame bottom part 20 and the like, whereby there was a limit that it has no choice but to cool the battery cells indirectly.

DETAILED DESCRIPTION OF THE INVENTION

Technical Problem

It is an object of the present disclosure to provide a battery module having improved cooling performance, and a battery pack including the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery module comprising: a battery cell stack in which a plurality of battery cells are stacked; a module frame for accommodating the battery cell stack; and a heat sink formed on a lower side of the module frame to cool the plurality of battery cells, wherein the heat sink includes a lower plate and a flow path part which defines a flow path for a refrigerant, wherein the flow path part includes: a first path set that collects first flow paths formed in a direction perpendicular to a stacking direction of the battery cell stack; and a second path set that collects second paths formed in a direction parallel to the stacking direction of the battery cell stack, and wherein a total length of the second path set is longer than a total length of the first path set.

The second paths forming the second path set may be formed so as to pass under at least two battery cells among a plurality of battery cells forming the battery cell stack.

At least one of the second paths forming the second path set may be formed so as to pass under all of the plurality of battery cells forming the battery cell stack.

The heat sink may further include an inlet through which the refrigerant enters, and an outlet through which the refrigerant flows exists, and both the inlet and the outlet may be formed on one side of the heat sink. The inlet and the outlet may be formed within the first paths forming the first path set.

The flow path part may further include a partition wall formed inside the flow path part along a direction in which the flow path part is formed.

The battery module may include a partition wall that subdivides the first flow paths and the second flow paths, the first flow path may include a path set that collects 1-1 paths formed in a direction perpendicular to the stacking direction of the battery cell stack; and a path set that collect 2-1 paths formed in a direction parallel to the stacking direction of the battery cell stack, the second flow path may include a path set that collects 1-2 paths formed in a direction perpendicular to the stacking direction of the battery cell stack; and a path set that collects 2-2 paths formed in a direction parallel to the stacking direction of the battery cell stack, whereby a total length of the first path set is a length of the path set that collects the 1-1 paths added to a length of the path set that collects the 1-2 paths, whereby a total length of the second path set is a length of the path set that collects the 2-1 paths added to a length of the path set that collects the 2-2 paths, and the total length of the second path set may be longer than the total length of the first path set.

The flow path part may further include side wall parts forming side surfaces. The side wall part may include a first side wall part formed in a direction perpendicular to the stacking direction of the battery cell stack; and a second side wall part formed in a direction parallel to the stacking direction of the battery cell stack, such that the total length of the second side wall part may be formed longer than the total length of the first side wall part.

A dimple part may be formed on a surface of the flow path part.

The flow path part is formed in a structure that is recessed downward from the lower plate, an upper side of the flow path part is covered by a bottom part of the module frame, and the refrigerant may flow in a space between the flow path part and the bottom part of the module frame.

According to another embodiment of the present disclosure, there is provided a battery pack comprising the above-mentioned battery module.

Advantageous Effects

According to embodiments of the present disclosure, the flow path is formed in parallel to the stacking direction of the battery cell stack and thereby, can reduce the temperature deviation between battery cells during cooling and improve the cooling performance of the battery module.

In addition, the cooling structure can be simplified through the cooling structure in which the module frame and the heat sink are integrated.

The effects of the present disclosure are not limited to the effects mentioned above and additional other effects not described above will be clearly understood from the description of the appended claims by those skilled in the art.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Below, the structure of a battery module according to an embodiment of the present disclosure will be described with reference to FIGS. 4 and 5.

Figure 4:
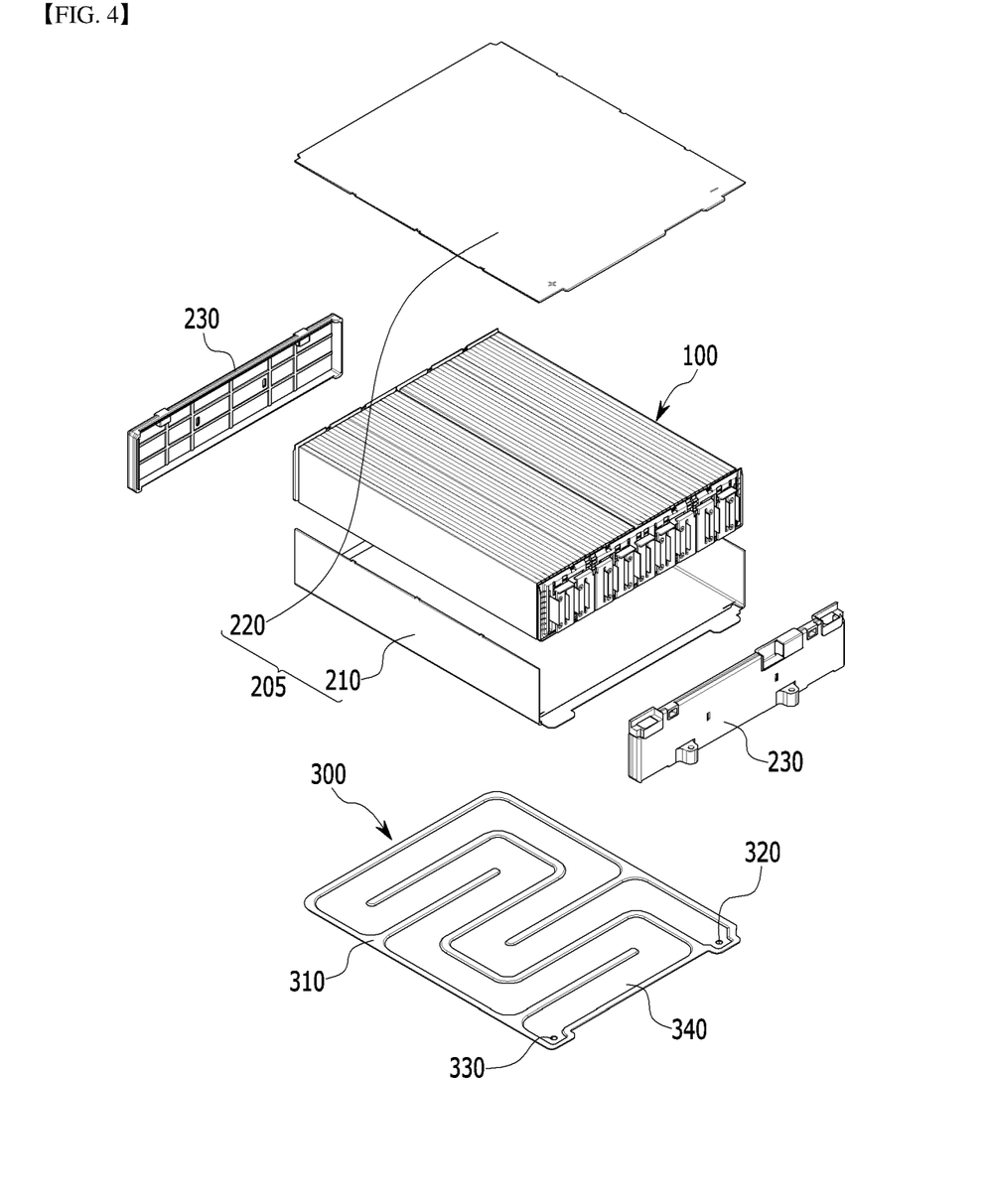
FIG. 4 is an exploded perspective view of a battery module according to an embodiment of the present disclosure.

FIG. 4 is an exploded perspective view of a battery module according to an embodiment of the present disclosure. FIG. 5 is a diagram showing a state in which the components of the battery module of FIG. 4 are assembled.

Figure 5:
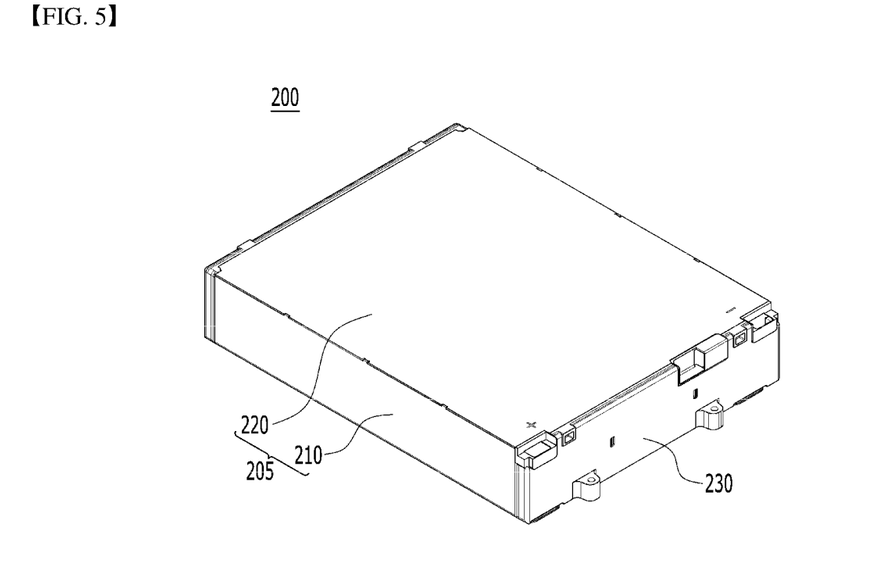
FIG. 5 is a diagram showing a state in which the components of the battery module of FIG. 4 are assembled.

Referring to FIGS. 4 and 5, the battery module 200 according to an embodiment of the present disclosure includes a battery cell stack 100 in which a plurality of battery cells are stacked, a module frame 205 for accommodating the battery cell stack 100; and a heat sink 300 formed on a lower side of the module frame 205 to cool the plurality of battery cells.

The battery cell according to the embodiment of the present disclosure is a secondary battery and may be configured into a pouch-type secondary battery. Such a battery cell may be composed of a plurality of cells, and the plurality of battery cells may be mutually stacked so as to be electrically connected to each other, thereby forming the battery cell stack 100. Each of the plurality of battery cells may include an electrode assembly, a cell case, and an electrode lead protruding from the electrode assembly.

The module frame 205 accommodates the battery cell stack 100. According to an embodiment of the present disclosure, the module frame 205 may include a lower frame 210 for covering the lower surface and both side surfaces of the battery cell stack 100, and an upper plate 220 for covering the upper surface of the battery cell stack 100. However, the structure of the module frame 205 is not limited thereto, and may be a mono frame shape surrounded by four surfaces except the front and rear surfaces of the battery cell stack 100.

The battery module 200 according to the embodiment of the present disclosure may further include end plates 230 for covering the front and rear surfaces of the battery cell stack 100. The battery cell stack 100 accommodated therein can be physically protected through the module frame 205 described above.

The heat sink 300 may be formed at the lower part of the module frame 205. The heat sink 300 may include a cooling plate 310 forming a skeleton of the heat sink 300 and contacting with the bottom part of the module frame 205, an inlet 320 formed on one side of the heat sink 300 to supply a refrigerant from the outside to the inside of the heat sink 300, an outlet 330 formed on one side of the heat sink so that the refrigerant flowing inside the heat sink flows to the outside of the heat sink, and a flow path part 340 that connects the inlet 320 and the outlet 330 and allows the refrigerant to flow.

Specifically, the flow path part 340 may refer to a structure in which a cooling plate 310 in contact with the lower surface of the lower frame 210 corresponding to the bottom part of the module frame 205 is formed to be recessed downward. The upper side of the flow path part 340 is opened, so that a flow path is formed between the flow path part 340 and the bottom part of the module frame 205, and a refrigerant can flow through the flow path. In other words, the battery module 200 according to the embodiment of the present disclosure can have a cooling integrated structure in which the bottom part of the module frame 205 serves to correspond to the upper plate of the heat sink 300.

Conventionally, a structure in which the refrigerant flows is separately formed on the lower side of the module frame, the module frame has no choice but to cool indirectly. Thus, the cooling efficiency is reduced and a separate refrigerant flowing structure is formed, which causes a problem that the space utilization rate on a battery module and a battery pack on which the battery module is mounted is lowered. However, according to an embodiment of the present disclosure, by adopting a structure in which the heat sink is integrated at the lower part of the module frame 205, the refrigerant can flow directly between the flow path part 340 of the heat sink 300 and the bottom part of the module frame 205, thereby increasing the cooling efficiency due to direct cooling, and through a structure in which the heat sink 300 is integrated with the bottom part of the module frame 205, the space utilization rate on a battery module and a battery pack on which the battery module is mounted can be further improved.

Below, with reference to FIGS. 6 to 9, the flowing path of the heat sink flow path part and effects resulting therefrom according to an embodiment of the present disclosure will be described in comparison with the comparative examples shown in FIGS. 2 and 3.

Figure 2:
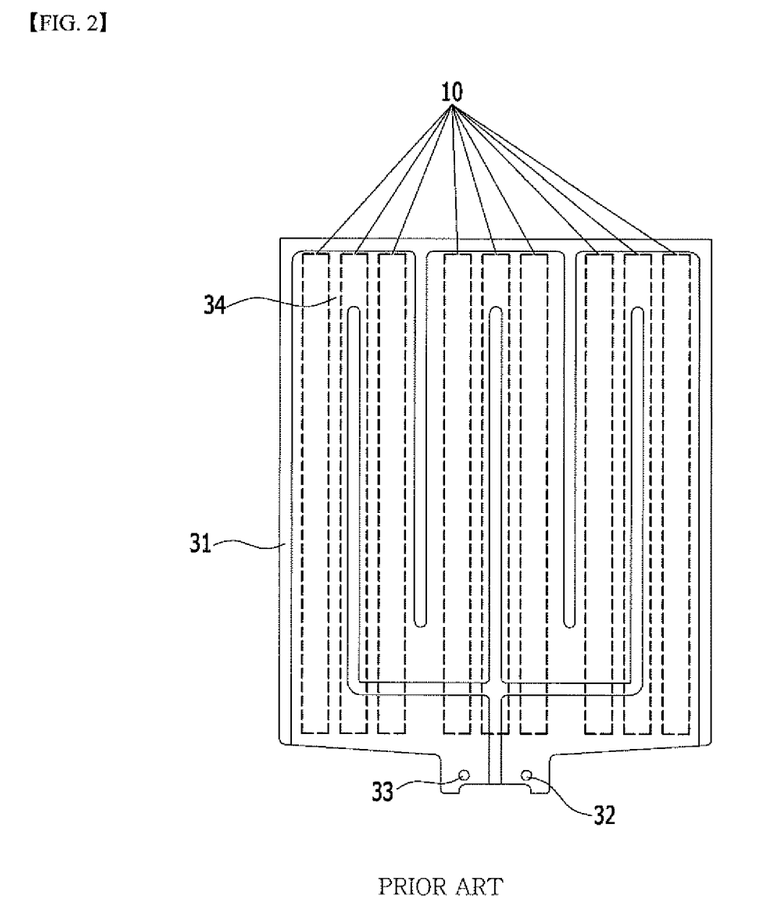
FIG. 2 is a plan view showing a flow path structure of the battery cells of FIG. 1 and a heat sink corresponding thereto, which is a comparative example.
Figure 6:
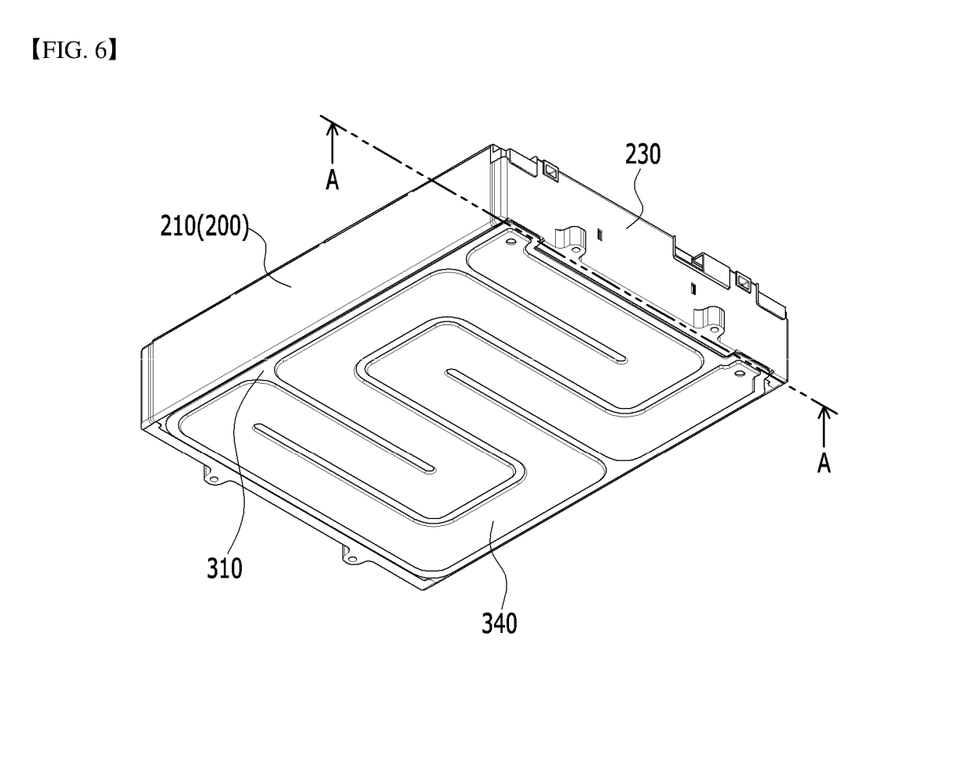
FIG. 6 is a view of the battery module assembled in FIG. 5 as viewed from the heat sink formed on the lower side part.
Figure 7:
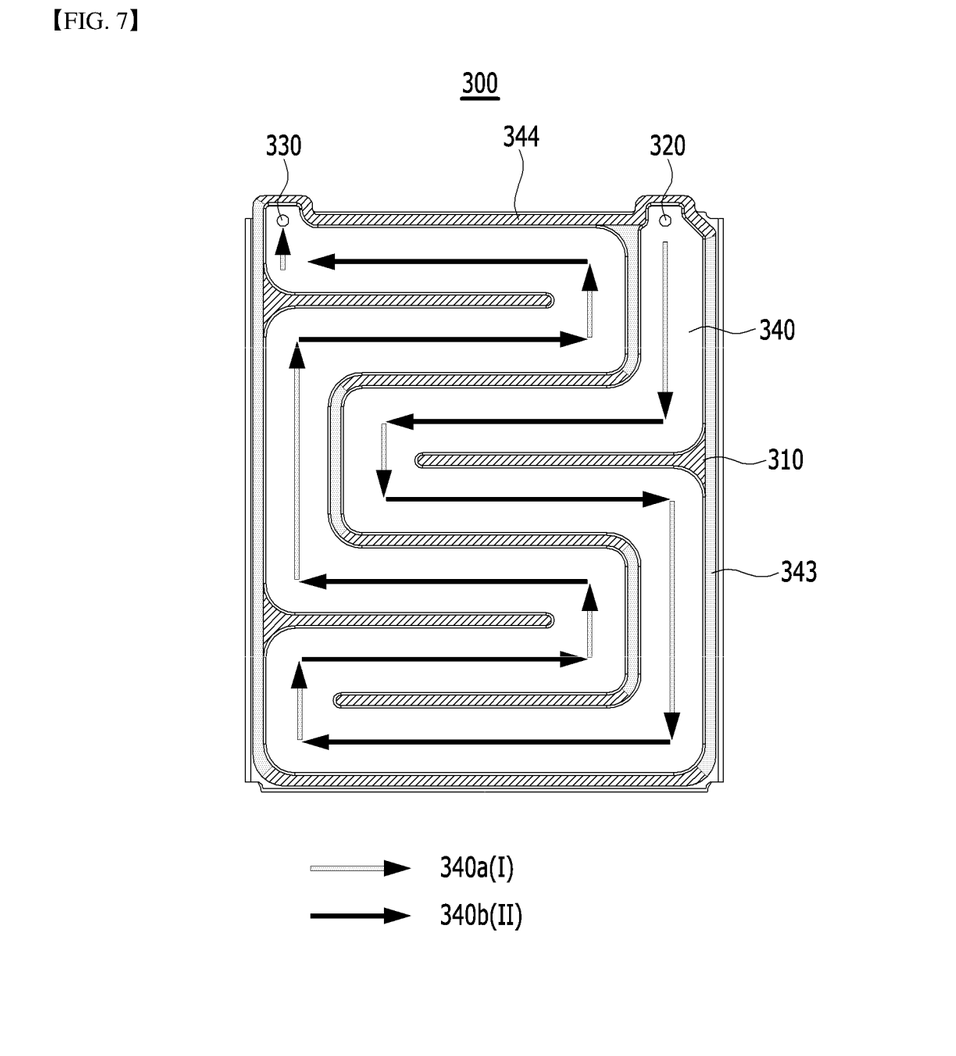
FIG. 7 is a cross-sectional view showing a heat sink in which the heat sink of FIG. 6 is cut taken in the horizontal direction, and the flowing direction of the refrigerant is indicated.
Figure 8:
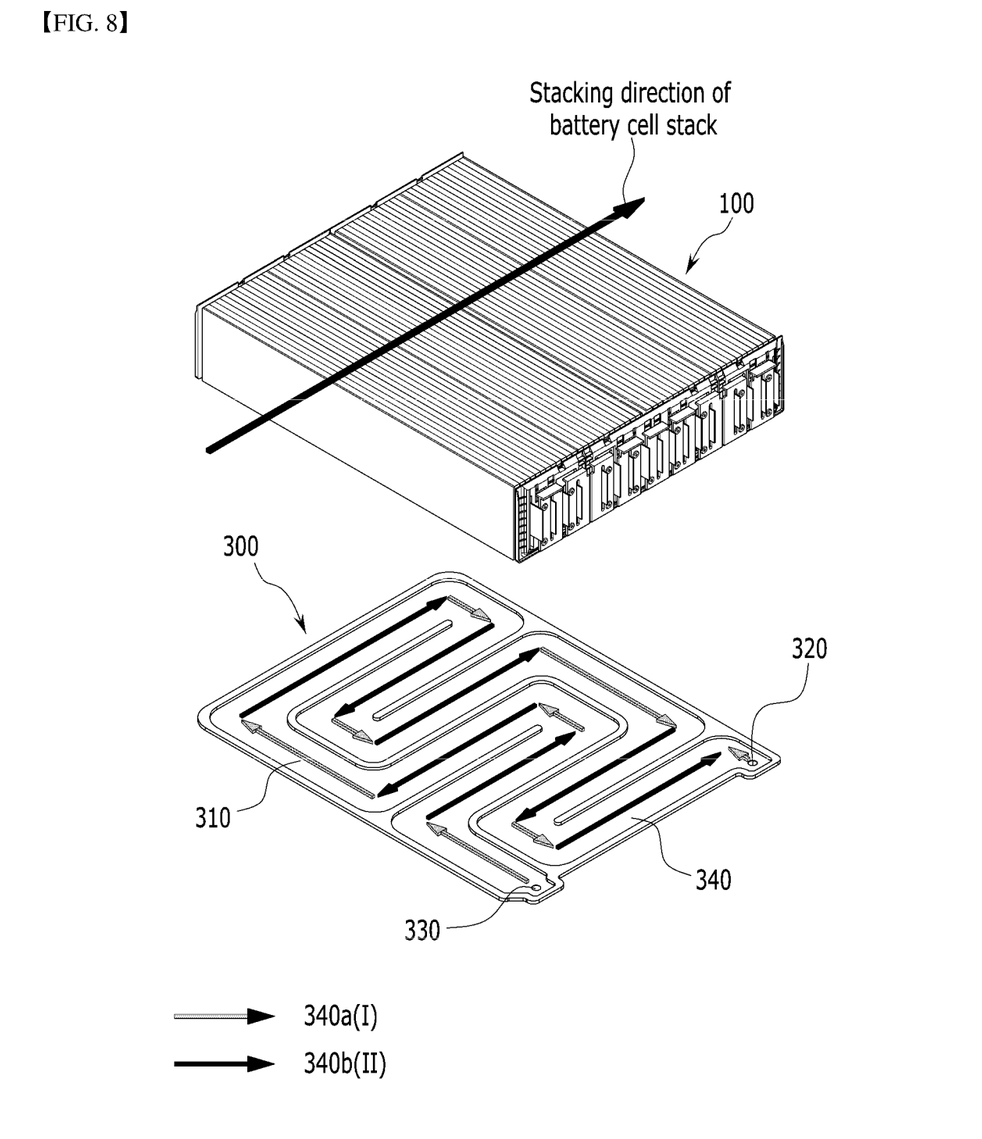
FIG. 8 is a diagram of comparing the flowing direction of the refrigerant of FIG. 7 with the stacking direction of the battery cell stack.
Figure 9:
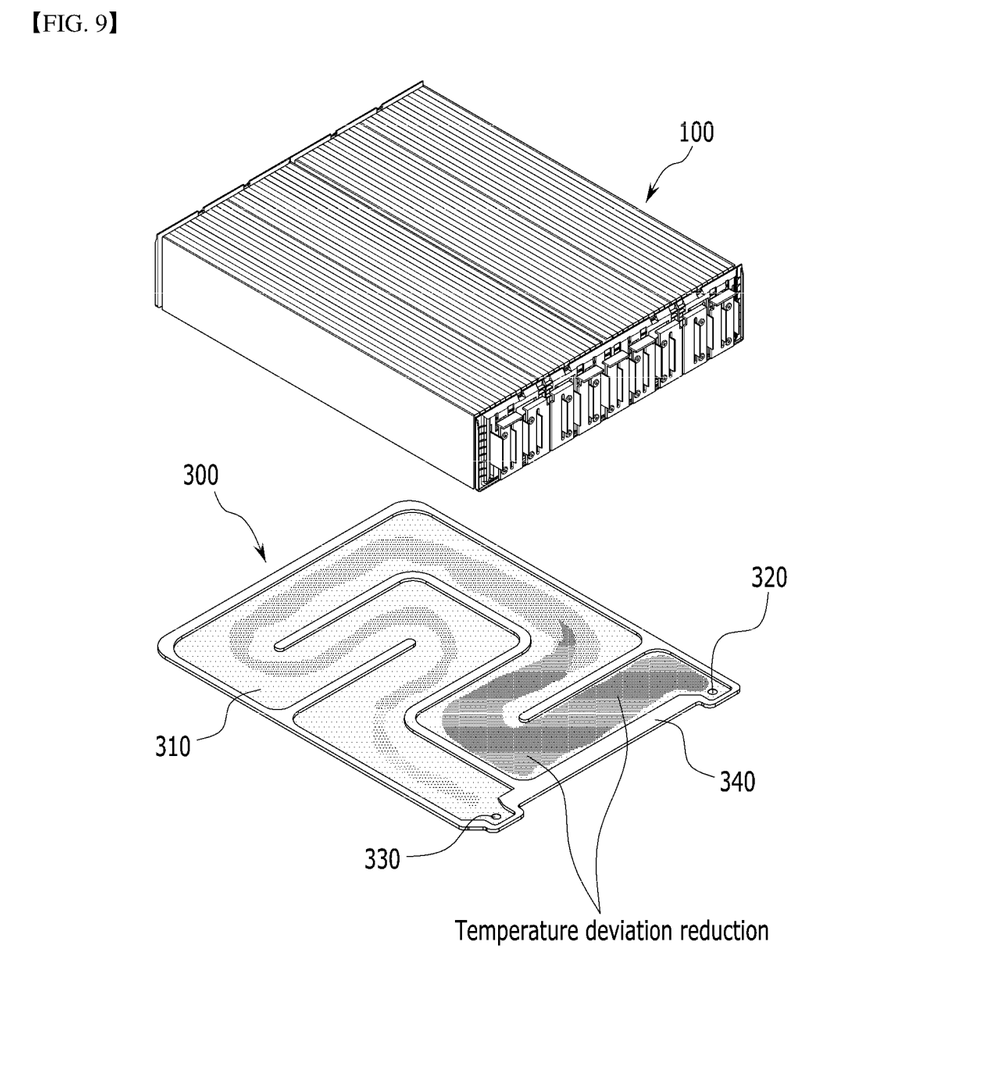
FIG. 9 is a diagram showing a state in which the refrigerant flows through the heat sink of FIG. 8.

FIG. 2 is a plan view showing a flow path structure of the battery cells of FIG. 1 and a heat sink corresponding thereto which is a comparative example. FIG. 3 is a diagram showing a state in which the refrigerant flows in the flow path structure of FIG. 2. FIG. 6 is a view of the battery module assembled in FIG. 5 as viewed from the heat sink formed on the lower side part. FIG. 7 is a cross-sectional view showing a heat sink in which the heat sink of FIG. 6 is cut taken in the horizontal direction, and the flowing direction of the refrigerant is indicated. FIG. 8 is a diagram of comparing the flowing direction of the refrigerant of FIG. 7 with the stacking direction of the battery cell stack. FIG. 9 is a diagram showing a state in which the refrigerant flows through the heat sink of FIG. 8.

Referring to FIGS. 6 to 9, in the heat sink 300 according to an embodiment of the present disclosure, the cooling plate 310 can be formed so as to correspond to the bottom part of the module frame 205. The bottom part of the module frame 205 corresponds to the bottom part of the lower frame 210, the cooling plate 310 and the bottom part of the lower frame 210 can be coupled by welding, etc. The rigidity of the entire battery module can be reinforced through the cooling plate 310. The cooling plate 310 and the bottom part of the lower frame 210 are sealed through weld-coupling, whereby a refrigerant can flow without leakage in the flow path part 340 formed inside the cooling plate 310.

Both the inlet 320 and the outlet 330 can be formed on one side of the heat sink 300. More specifically, both the inlet 320 and the outlet 330 may be formed on one side of the heat sink 300 that is formed at a portion at which the end plate 230 is located. The inlet 320 and the outlet 330 may be respectively located at both ends of one side of the heat sink 300. A refrigerant supply part and a refrigerant discharge part are formed on a lower side or an upper side of the heat sink 300, so that the refrigerant supplied through the refrigerant supply part can flow into the inlet 320, and the refrigerant flowing out through the outlet 330 can be discharged to the outside through the refrigerant discharge part.

The flow path part 340 may be formed so as to cover the bottom part of the module frame 205 while being bent. The flow path part 340 is formed in most of areas of the bottom part of the module frame 205 excluding a portion in which the lower plate 310 makes contact with the bottom part of the module frame 205, whereby all the portions of the battery cell stack 100, which are arranged so as to occupy most of areas of the bottom part of the module frame 205, can be uniformly cooled.

According to an embodiment of the present disclosure, as shown in FIGS. 7 and 8, the flowing path of the flow path part 340 includes: a first path set I that collects first flow paths 340a formed in a direction perpendicular to the stacking direction of the battery cell stack 100, and a second path set II that collects second paths 340b formed in a direction parallel to the stacking direction of the battery cell stack 100, and the total length of the second path set II is formed longer than the total length of the first path set I.

Figure 3:
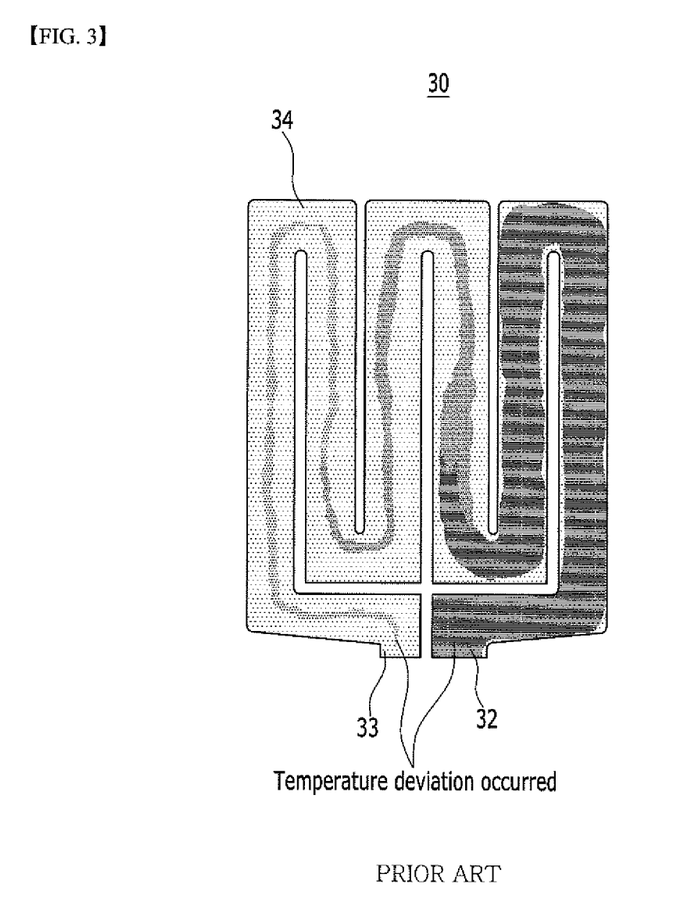
FIG. 3 is a diagram showing a state in which the refrigerant flows in the flow path structure of FIG. 2.

Referring to FIGS. 2 and 3, the heat sink 30 according to a comparative example of the present disclosure may include an inlet 32 through which the refrigerant flows in, an outlet 33 through which the refrigerant flows out, and a lower plate 31 having a flow path 34 that connects the inlet 32 and the outlet 33. As shown in FIG. 2, the cooling flow path 34 may be formed such that the longitudinal direction of the battery cells 10 is the main direction. As is shown in FIG. 3, the direction in which the cooling flow path 34 is formed is in a direction parallel to the longitudinal direction of the battery cells 10 formed by stacking on the upper side of the cooling flow path 34, so that a difference in cooling temperature may occur depending on the left and right positions of the battery cells. When the cooling temperature difference occurs in this way, the battery cell stack is not uniformly cooled, and so there is a risk that the overall cooling performance of the battery module is deteriorated. In addition, in the case of a large-area battery module in which the number of battery cells stacked in the battery cell stack increases significantly compared to a conventional case, the width of the flow path may be formed wider, so that the temperature deviation may be more severe.

Thus, according to one embodiment of the present disclosure, as shown in FIG. 8, the flowing paths of the flow path part include: a first path set I that collects first flow paths 340*a* formed in a direction perpendicular to the stacking direction of the battery cell stack 100, and a second path set II that collects second paths 340*b* formed in a direction parallel to the stacking direction of the battery cell stack 100. At this time, according to the embodiment of the present disclosure, the total length of the second path set II may be formed longer than the total length of the first path set I. Therefore, as shown in FIG. 9, the path of the refrigerant flowing across the plurality of battery cells is formed longer than the path of the refrigerant flowing parallel to the longitudinal direction of the plurality of battery cells, thereby capable of reducing the temperature deviation between battery cells and improving the cooling performance. The effects of reducing the temperature deviation and improving the cooling performance may be more effectively shown in a large-area battery module in which the width of the flow path is formed wider, which is an embodiment of the present disclosure.

According to one embodiment of the present disclosure, the second paths 340*b* forming the second path set II may be formed so as to pass under at least two or more battery cells among a plurality of battery cells forming the battery cell stack 100. Moreover, both the inlet 320 and the outlet 330 are formed on one side of the heat sink 300, and one side of the heat sink 300 on which the inlet 320 and the outlet 330 are formed is located in a direction perpendicular to the stacking direction of the battery cell stack, so that all paths connected to the inlet 320 and the outlet 330 may be formed as the first path 340*a*.

Referring to FIG. 7, the flow path part 340 further includes side wall parts 343 and 344 forming both side surfaces of the flow path part 340, and the side wall parts 343 and 344 include a first side wall part 343 formed in a direction perpendicular to the stacking direction of the battery cell stack 100, and a second side wall part 344 formed in a direction parallel to the stacking direction of the battery cell stack 100, and the total length of the second side wall part 344 may be formed longer than the total length of the first side wall part 343.

The side wall parts 343 and 344 form a part of the cooling plate 310, and upper ends of the side wall parts 343 and 344 may be weld-coupled to the bottom part of the module frame. Of the side wall parts 343 and 344, the length of the second side wall part 344 formed in a direction parallel to the stacking direction of the battery cell stack is formed longer than the length of the first side wall part 343 formed in a direction perpendicular to the stacking direction of the battery cell stack 100, whereby the load of the plurality of battery cells can be effectively supported through the second side wall part 344 formed across the lower side of the at least two battery cells.

Figure 10:
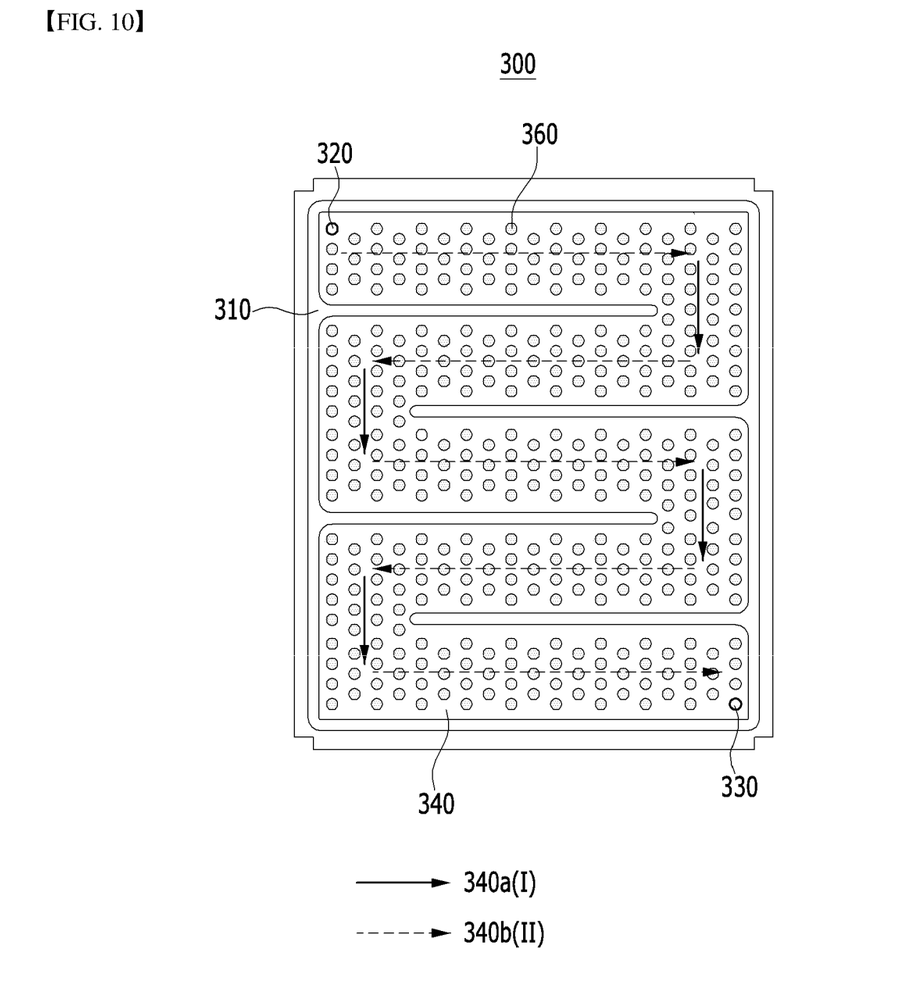
FIG. 10 is a diagram showing a flow direction of a refrigerant flowing in a heat sink in which a dimple part is formed according to a modified embodiment of the present disclosure.

The contents of the heat sink in which a dimple part is formed is shown in FIG. 10.

FIG. 10 is a diagram showing a flow direction of a refrigerant flowing in a heat sink in which a dimple part is formed according to a modified embodiment of the present disclosure.

Referring to FIG. 10, the dimple part 360 may be formed on the surface of the flow path part 340. By adjusting the flow of the refrigerant through the dimple part 360, the cooling temperature deviation between parts of the flow path part 340 can be minimized, and thus the cooling performance of the battery module can be improved. Specifically, the dimple part 360 can be formed of a plurality of dimples that are formed in a hemispherical shape protruding upward from the surface of the flow path part 340. In other words, when the battery module is viewed from bottom to top, the lower surface of the heat sink 300 may have a concave shape. The plurality of dimples can be formed to be spaced apart from each other. Therefore, as shown in FIG. 10, the refrigerant flows uniformly while passing between the dimple parts 360 formed of a plurality of dimples, so that cooling performance indexes such as maximum cooling temperature, temperature deviation, and thermal resistance can be improved.

Figure 11:
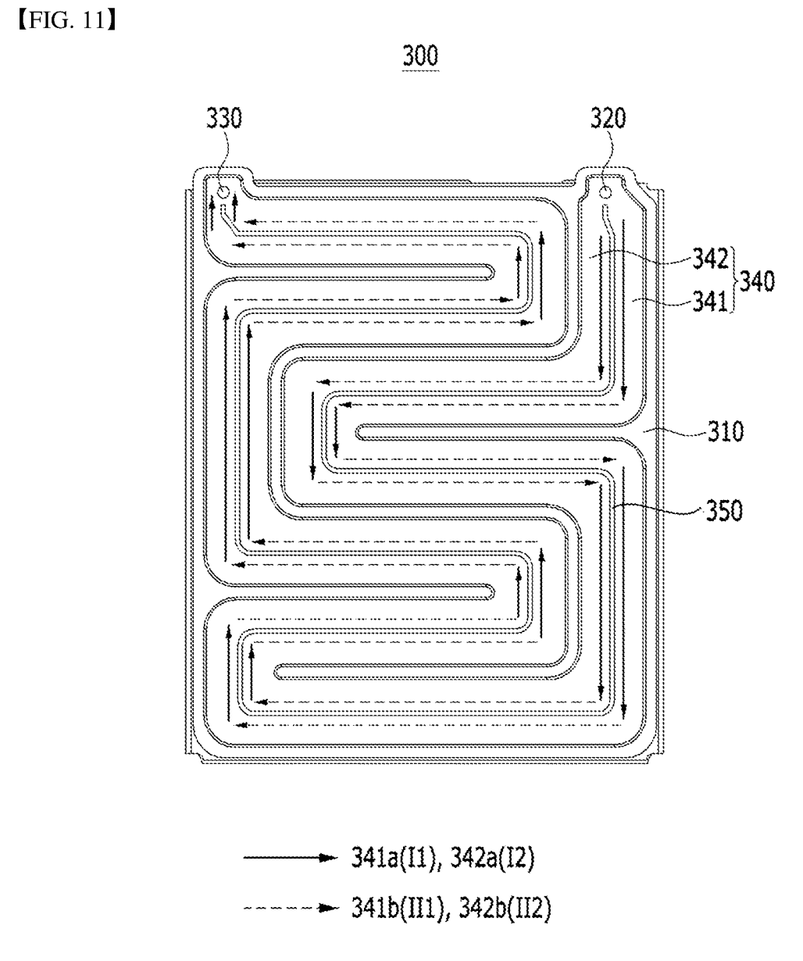
FIG. 11 is a diagram showing a direction in which the refrigerant flows in a heat sink having a partition wall formed thereon according to a modified embodiment of the present disclosure.
Figure 12:
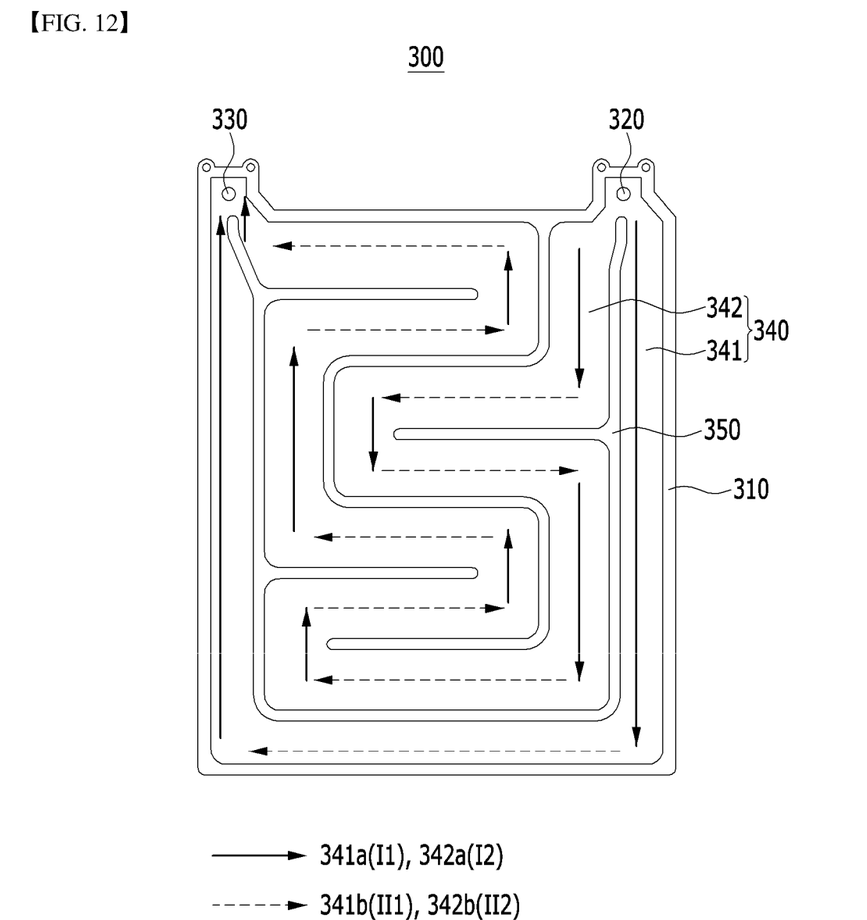
FIG. 12 is a diagram showing a direction in which the refrigerant flows in a heat sink having a partition wall formed thereon according to a modified embodiment of the present disclosure.

The contents concerning the heat sink in which the partition wall is formed is shown in FIGS. 11 and 12.

FIG. 11 is a diagram showing a direction in which the refrigerant flows in a heat sink having a partition wall formed thereon according to a modified embodiment of the present disclosure. FIG. 12 is a diagram showing a direction in which the refrigerant flows in a heat sink having a partition wall formed thereon according to a modified embodiment of the present disclosure.

Referring to FIGS. 4, 11 and 12, the flow path part 340 may further include a partition wall 350 formed inside the flow path part 340 along the direction in which the flow path part 340 is formed. The partition wall 350 according to the modified embodiment of the present disclosure reduces the width of the flow path part 340 without changing the flow path length of the flow path part 340, and thereby, can minimize the pressure drop and at the same time, can reduce the temperature deviation between the flow path widths. The upper end of the partition wall 350 and the upper end of the cooling plate 310 can be coupled to the lower surface of the module frame 205 by a method such as welding.

Not only the pressure drop and temperature deviation of the flowing refrigerant can be minimized by the partition wall 350, but also in addition to the cooling plate 310, the partition wall 350 can also be coupled with the bottom part of the module frame 205, thus having the effects of supporting the load of the module frame 205 and the battery cell stack accommodated in the module frame 205 and reinforcing the rigidity of the battery module.

The partition wall 350 can be formed so as to extend from the inlet 320 to the outlet 330 along a central portion of the flow path part 340. Through this, the refrigerant flowing into the inlet 320 can be guided up to the outlet 330 along the partition wall 350.

The start point of the partition wall 350 is formed so as to be spaced apart from the inlet 320, and the refrigerant flowing in through the inlet 320 can flow from the start point of the partition wall 350 by being divided into the first flow path part 341 and the second flow path part 342 that are formed through the partition wall 350. In this case, the widths of the first flow path part 341 and the second flow path part 342 are formed to be the same, and the widths of the first flow path part 341 and the second flow path part 342 can be consistently formed from the inlet 320 to the outlet 340. Therefore, the flow cannot be biased toward any one side of the first and second flow path parts 341 and 342, and it is possible to minimize a difference in temperature deviation between flow path parts that may occur by widening the width of any one of the first and second flow path parts 341 and 342. In addition, since the widths of the flow path parts 340 are formed constantly, the possibility of pressure drop and temperature deviation, which may occur when the width is widened or narrowed, can be minimized.

According to the modified embodiment of the present disclosure, as shown in FIG. 11, the refrigerant flows by being divided into first and second flow path parts 341 and 342 formed with reference to the partition wall 350, and the flowing path of the first flow path part 341 may include: a 1-1 path set I1 that collects 1-1 paths 341a formed in a direction perpendicular to the stacking direction of the battery cell stack 100, and a 2-1 path set II1 that collects 2-1 paths 341b formed in a direction parallel to the stacking direction of the battery cell stack 100. Further, the flowing path of the second flow path part 342 may include: a 1-2 path set I2 that collects 1-2 paths 342a formed in a direction perpendicular to the stacking direction of the battery cell stack 100, and a 2-2 path set I12 that collects 2-2 paths 342b formed in a direction parallel to the stacking direction of the battery cell stack 100.

In this case, the total length of the first path set I is a length adding the total length of the 1-1 path set I1 and the total length of the 1-2 path set I2, the total length of the second path set II is a length adding the total length of the 2-1 path set II1 and the total length of the 2-2 path set II2, and the total length of the second path set II may be longer than the total length of the first path set I. Through this, a path through which the refrigerant flows across the plurality of battery cells is formed longer than a path that flows in parallel to the longitudinal direction of the plurality of battery cells, thus reducing the temperature deviation between the battery cells and improving the cooling performance.

At this time, the partition wall 350 can also be divided into a portion formed in the direction formed by the paths constituting the first path set I and a portion formed in the direction formed by the paths constituting the second path set II. The total length of the portions formed in the direction formed by the paths constituting the second path set II may be formed longer than the total length of the portions formed in the direction formed by the paths constituting the first path set I.

In the partition wall 350, the portion formed in the direction in which the paths constituting the second path set II are formed can be formed in a direction crossing the lower side of the plurality of battery cells of the battery cell stack, so that the load of the plurality of battery cells can be supported more effectively.

FIG. 12 is a diagram showing a modified embodiment of a heat sink in which a partition wall having a structure different from that of FIG. 11 is formed.

Referring to FIG. 12, at least one of the second paths 341b and 342b forming the second path set II may be formed so as to pass under all of the plurality of battery cells forming the battery cell stack. In addition, among the paths formed in the flow path parts flowing through the deformed partition wall structure, the flow path and the partition wall structure having various modifications may be implemented such that the total length of the paths formed in the direction crossing the plurality of battery cells is longer than the total length of the paths formed in the direction parallel to the plurality of battery cells.

The above-mentioned battery module can be included in the battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

[Description of Reference Numerals]

205: module frame
210: lower frame
220: upper plate
230: end plate
300: heat sink
310: cooling plate
320: inlet
330: outlet
340: flow path part
340a: first path
340b: second path
341: first flow path
341a: 1-1 path
341b: 1-2 path
342: second flow path
342a: 2-1 path
342b: 2-2 path
343: first side wall part
344: second side wall part
350: partition wall
360: dimple part
I: first path set
I1: 1-1 path set
I2: 1-2 path set
II: second path set
II1: 2-1 path set
II2: 2-2 path set

The invention claimed is:

1. A battery module comprising:
a battery cell stack in which a plurality of battery cells are stacked, each battery cell extending in a longitudinal direction, the battery cells being stacked adjacent to one another in a lateral direction perpendicular to the longitudinal direction;
a module frame for accommodating the battery cell stack, the module frame having a rectangular shape defining a length in the longitudinal direction and a width in the lateral direction, the length being longer than the width; and
a heat sink formed on a lower side of the module frame to cool the plurality of battery cells,
wherein the heat sink includes a lower plate, an inlet, an outlet, and a flow path part that connects the inlet and the outlet and which defines a flow path for a refrigerant,
wherein the flow path part includes:
a first path set that collects first flow paths extending in the longitudinal direction perpendicular to a stacking direction of the battery cell stack; and a second path set that collects second paths extending in the lateral direction parallel to the stacking direction of the battery cell stack; and a first side wall part extending in the longitudinal direction and a second side wall part extending in the lateral direction, a total length of the second side wall part being longer than a total length of the first side wall part, wherein a total length of the second path set in the lateral direction of the module frame is longer than a total length of the first path set in the longitudinal direction of the module frame, and wherein the first flow paths include an inflow path from the inlet and an outflow path to the outlet, the inflow path and the outflow path both extending in the longitudinal direction, and wherein each of the first flow paths and the second flow paths is wider than each of the first side wall part and the second side wall part, such that the flow path part overlies most of a total area of the lower side of the module frame.

2. The battery module of claim 1, wherein the second paths forming the second path set are formed so as to pass under at least two battery cells among the plurality of battery cells forming the battery cell stack.

3. The battery module of claim 1, wherein at least one of the second paths forming the second path set is formed so as to pass under all of the plurality of battery cells forming the battery cell stack.

4. The battery module of claim 1, wherein both the inlet and the outlet are formed on one side of the heat sink.

5. The battery module of claim 4, wherein the inlet and the outlet are formed within the first paths forming the first path set.

6. The battery module of claim 1, wherein the flow path part further comprises a partition wall formed inside the flow path part along a direction in which the flow path part is formed.

7. The battery module of claim 6, wherein the partition wall subdivides the first flow paths and subdivides the second flow paths, the subdivided first flow path comprises:
a path set that collects 1-1 paths formed in a direction perpendicular to the stacking direction of the battery cell stack; and
a path set that collects 2-1 paths formed in a direction parallel to the stacking direction of the battery cell stack, the subdivided second flow path comprises:
a path set that collects 1-2 paths formed in a direction perpendicular to the stacking direction of the battery cell stack; and
a path set that collects 2-2 paths formed in a direction parallel to the stacking direction of the battery cell stack, wherein a total length of the first path set is a length of the path set that collects 1-1 paths added to a length of the path set that collects 1-2 paths, wherein a total length of the second path set is a length of the path set that collects 2-1 paths added to a length of the path set that collects 2-2 paths, and the total length of the second path set is longer than the total length of the first path set.

8. The battery module of claim 1, wherein the flow path part further comprises side wall parts forming side surfaces.

9. The battery module of claim 8, wherein the side wall part comprises:
a first side wall part formed in a direction perpendicular to the stacking direction of the battery cell stack; and
a second side wall part formed in a direction parallel to the stacking direction of the battery cell stack, and
the total length of the second side wall part is formed longer than the total length of the first side wall part.

10. The battery module of claim 1, wherein a dimple part is formed on a surface of the flow path part.

11. The battery module of claim 1, wherein the flow path part is formed in a structure that is recessed downward from the lower plate, an upper side of the flow path part is covered by a bottom part of the module frame, and the refrigerant flows in a space between the flow path part and the bottom part of the module frame.

12. A battery pack comprising the battery module of claim 1.

* * * * *